Nov. 3, 1970   R. N. ZOGRAN ET AL   3,537,910
NUCLEAR REACTOR THERMOELECTRIC POWER PLANT
Filed Aug. 2, 1967   9 Sheets-Sheet 1

FIG.I.

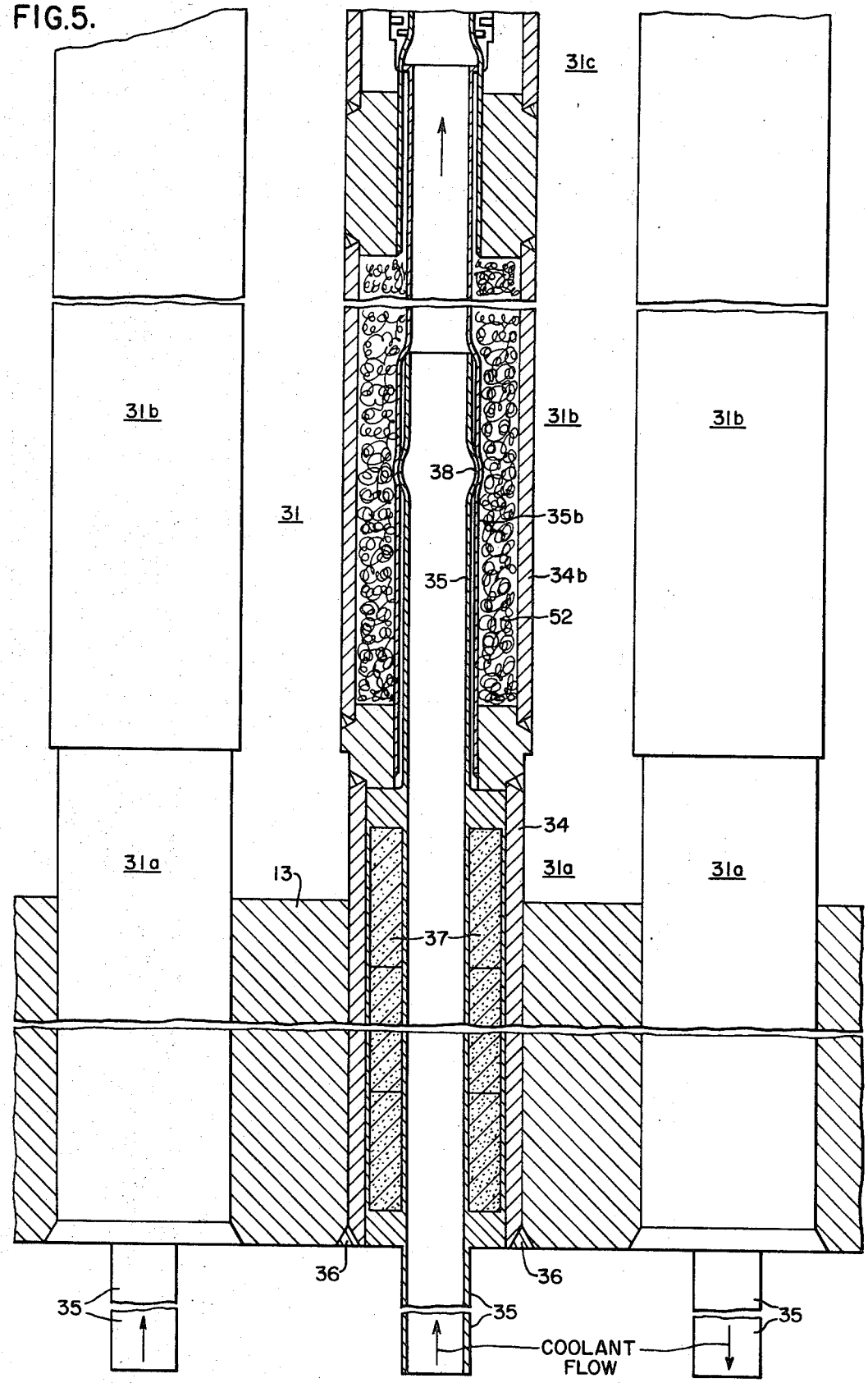

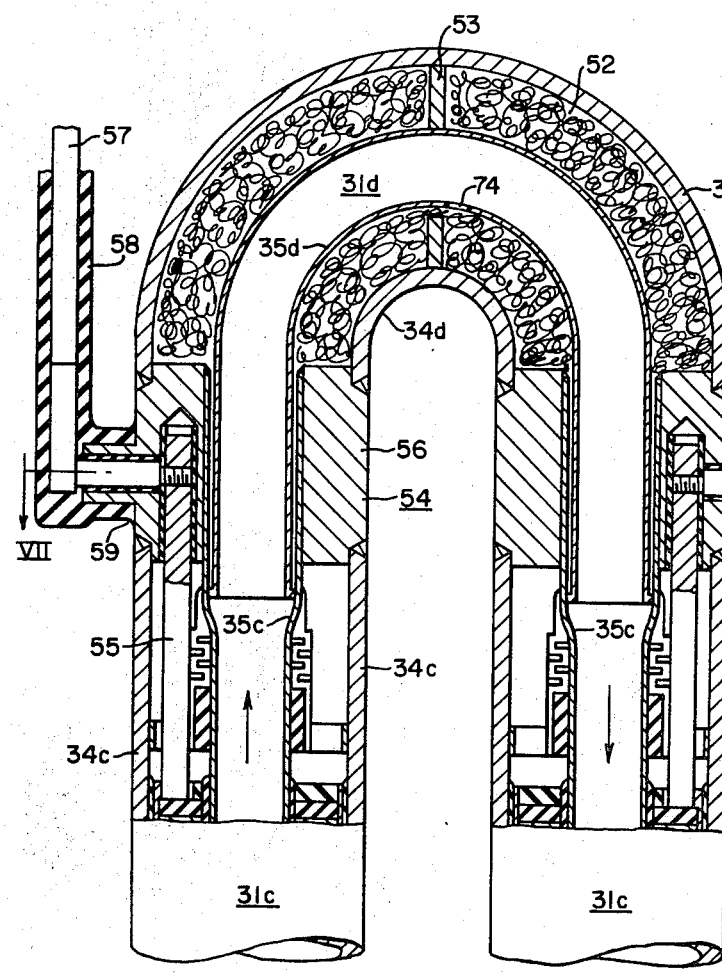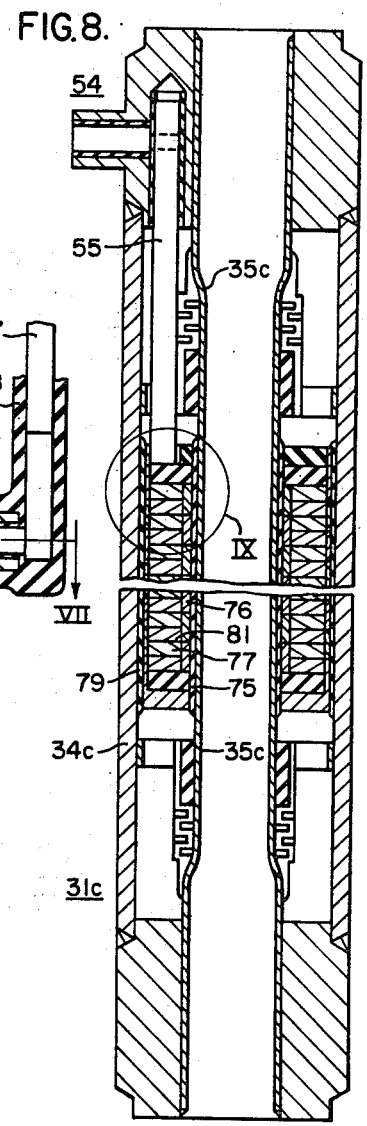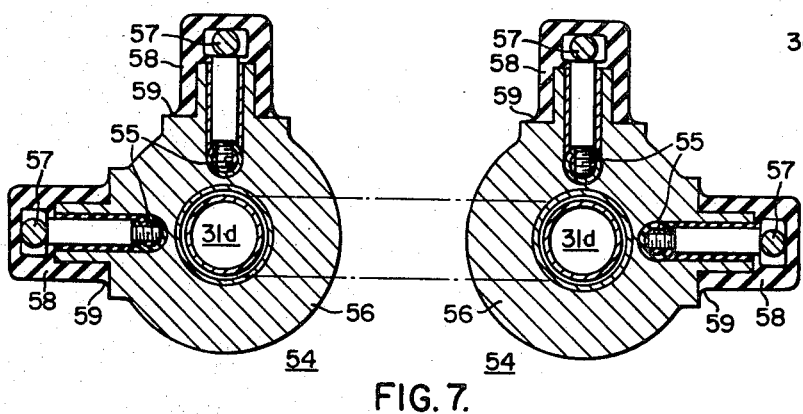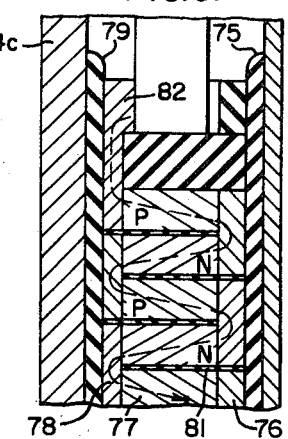

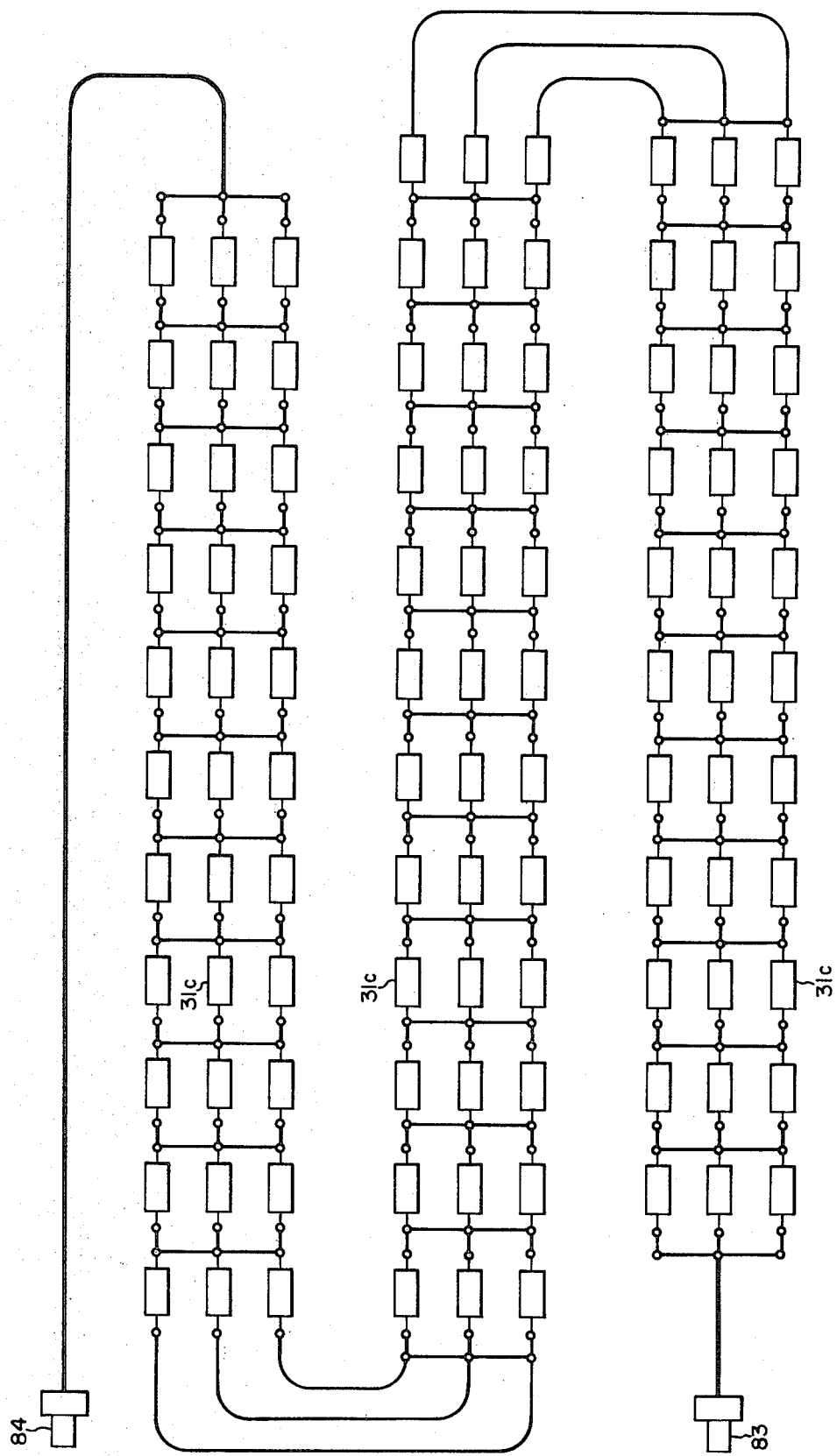

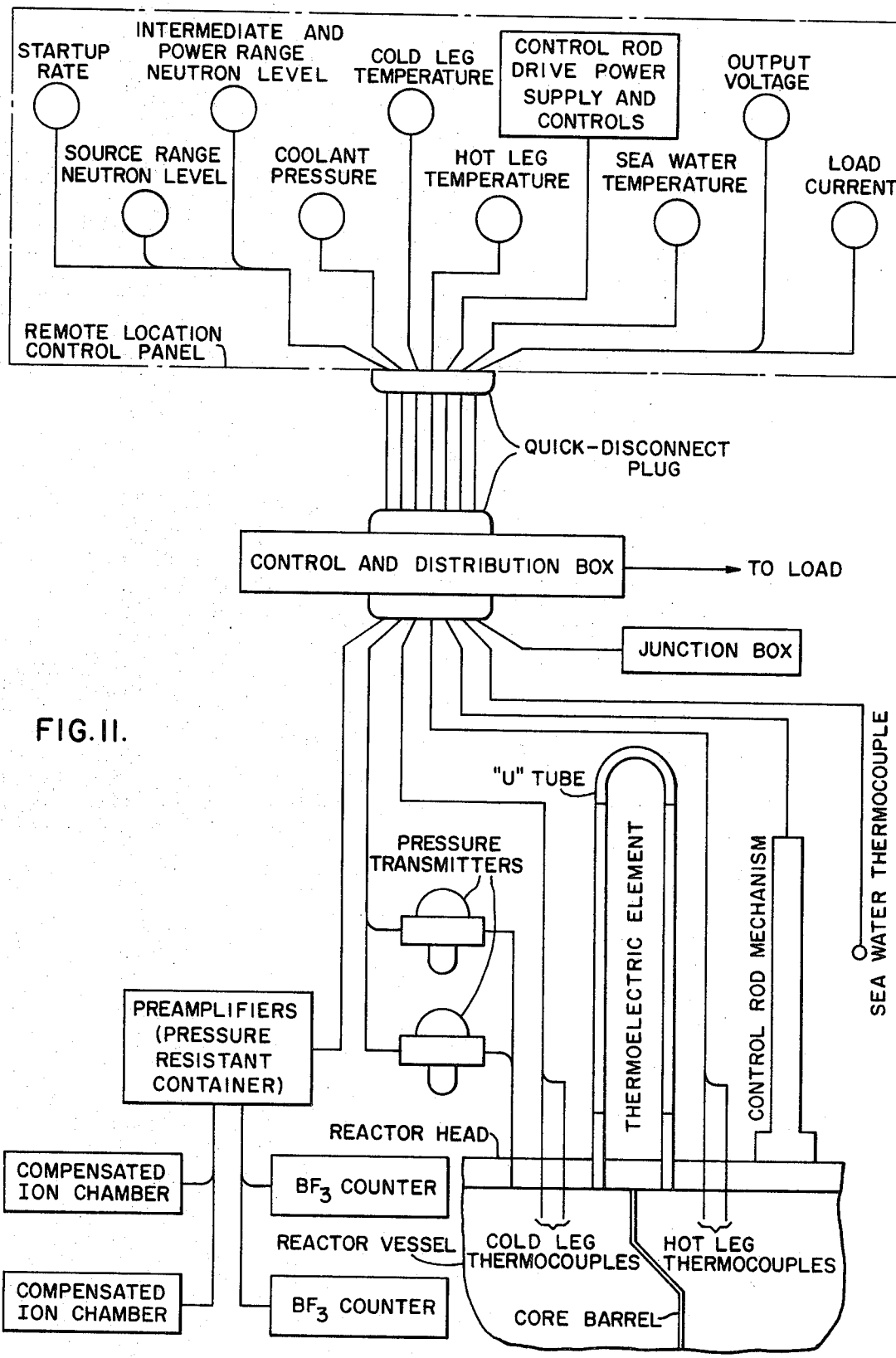
FIG. II.

United States Patent Office 3,537,910
Patented Nov. 3, 1970

3,537,910
NUCLEAR REACTOR THERMOELECTRIC POWER PLANT
Raymond N. Zogran, Oxon Hill, Sterling J. Weems, Chevy Chase, and Herbert Estrada, Jr., Silver Spring, Md., and Julian C. Nichols, McLean, Va., assignors to Westinghouse Electric Corporation, Pittsburgh, Pa., a corporation of Pennsylvania
Filed Aug. 2, 1967, Ser. No. 657,893
Int. Cl. G21h 1/10
U.S. Cl. 136—202  10 Claims

ABSTRACT OF THE DISCLOSURE

A nuclear reactor is coupled with a thermoelectric generator in a plant for underwater application. The plant is constructed for long-term unattended operation, and for positioning on the ocean floor near the location of the power consumer. Operation of the plant requires no moving parts after steady state conditions have been achieved. The arrangement consists essentially of an assembly of thermoelectric elements mounted on U-tubes attached to the head of a reactor vessel. Primary coolant flows by natural circulation from the reactor core through the inside of the U-tubes to supply heat to the thermoelectric elements.

BACKGROUND OF THE INVENTION

This invention relates, generally, to electric generating systems and, more particularly, to nuclear reactor thermoelectric generators suitable for operation underwater.

Relatively recent economic, political, and technical developments have directed attention to the continental shelves, slopes, and the deep ocean bottom, as well as the vast quantity of water above them, as possible sources of food, mineral resources, and unidentified technological opportunities, as well as secure bases for military operations. A common feature of efforts to exploit the oceans for any of the foregoing purposes is the need for power supplies independent of the atmosphere to provide power for propulsion, life support and underwater operations. Limited success has been achieved in efforts dependent on rechargeable storage batteries. The use of fuel cells in place of batteries is expected to improve the performance of power supplies in both specific energy storage and power level. The most promising energy source for undersea operations is the controlled nuclear fission reactor since it combines very high specific energy storage with controllable and potentially high power level.

An object of the invention is to provide a nuclear reactor thermoelectric generating plant capable of withstanding large submergence pressure.

Another object of the invention is to provide an electric generating plant which utilizes a reactor and thermoelectric units in which the reactor closure acts as a transition between the thermoelectric generator and the nuclear reactor, and which is arranged to permit natural convection of reactor coolant between the reactor core and thermoelectric generator.

A further object of the invention is to provide a nuclear reactor of the pressurized water type which pressurizes itself and remains pressurized by a combination of water vapor and gas pressure in a surge chamber in the reactor vessel.

Still another object of the invention is to provide an arrangement of thermoelectric elements on U-tubes so constructed that any gas which may be released under abnormal conditions will accumulate in a specific space provided in the U-bends so that the gas will not impair performance or restarting of the reactor.

A still further object of the invention is to provide additional space below the head of the reactor for accumulation of any gas which may be released under abnormal conditions.

Other objects of the invention will be explained fully hereinafter or will be apparent to those skilled in the art.

SUMMARY OF THE INVENTION

In accordance with one embodiment of the invention, thermoelectric elements are mounted on U-tubes attached to the head of a reactor vessel. Primary coolant water, at high temperature, flows by natural circulation from the reactor core through the inside of the U-tubes. Electricity is generated by the temperature drop across the tubular thermoelectric elements which are cooled at their outer surfaces by the water in which the plant is placed. The reactor core is housed in a reactor vessel supported in a shield tank which contains water to minimize neutron activation of the surrounding media. The primary coolant pressure is maintained by a surge chamber which is inside the reactor vessel. Gas accumulation spaces are provided at the underside of the reactor vessel head, and at the top of the U-bend of the U-tubes, to prevent gas blanketing and flow stoppage in the tubes if gas is released from the coolant upon shutdown of the reactor. Thermal insulation of the primary coolant is provided by the reactor vessel itself, by the walls of the surge chamber, and by double walled pipe penetrations and U-bends of the U-tubes. The shield tank is pressure compensated with submergence pressure through a double relief valve arrangement.

BRIEF DESCRIPTION OF THE DRAWINGS

For a better understanding of the nature and objects of the invention, reference may be had to the following detailed description, taken in conjunction with the accompanying drawings, in which:

FIG. 5 is an enlarged detail view, partly in section and partly in elevation, showing the transition zone between the thermoelectric generator and the reactor;

FIG. 6 is an enlarged view, in section, showing thermoelectric and U-bend connection details;

FIG. 7 is a view, in section, taken along the line VII—VII in FIG. 6;

FIG. 8 is a view, in section, of one of the thermoelectric elements of the thermoelectric generator;

FIG. 9 is an enlarged detail view, in section, of a portion of one of the thermoelectric elements;

FIG. 10 is a diagrammatic view showing the manner of connecting the thermoelectric elements in series-parallel circuit relation;

FIG. 11 is a block diagram of the control system for the power plant;

DESCRIPTION OF THE PREFERRED EMBODIMENT

Figure 1:
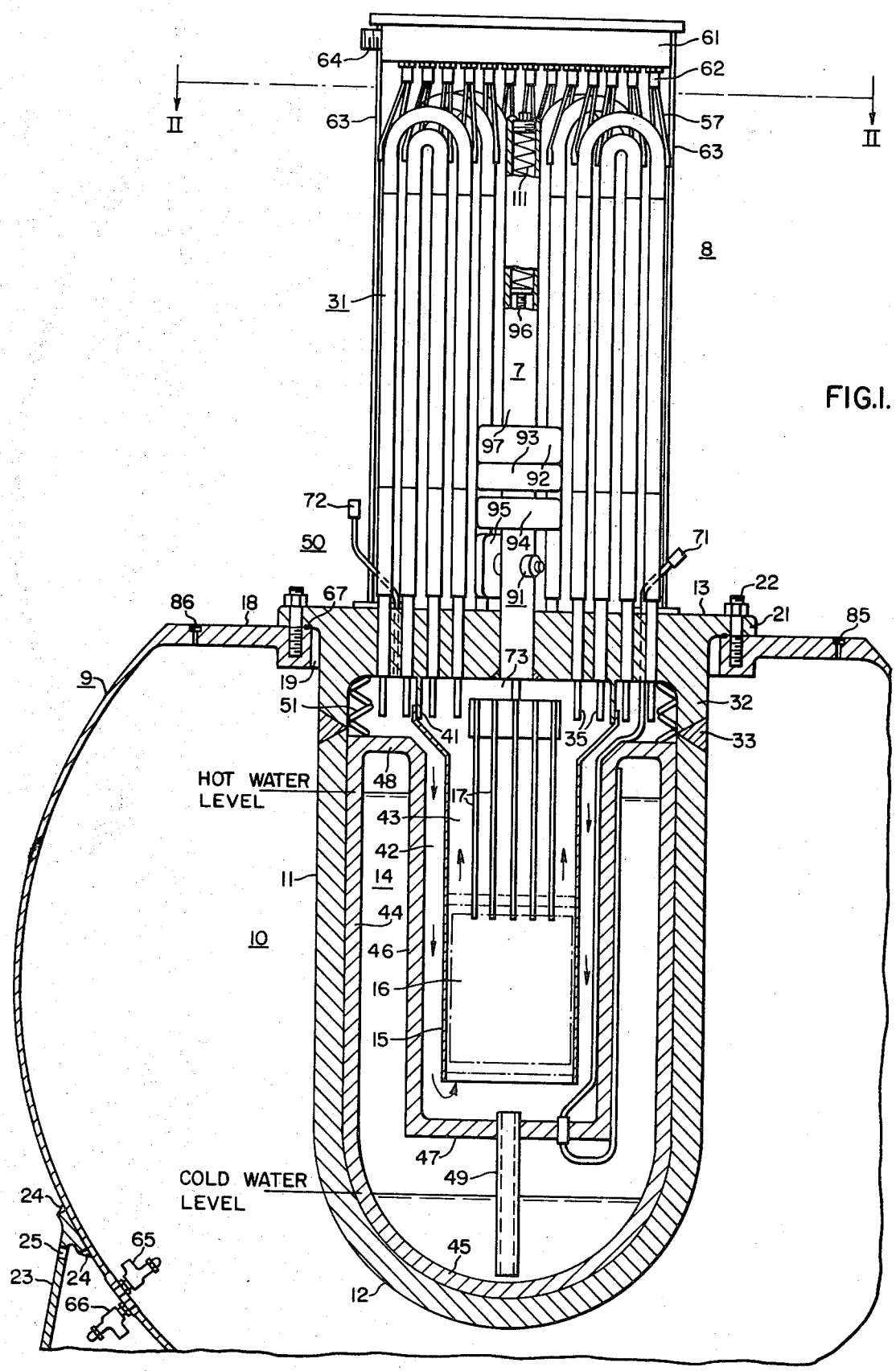
FIG. 1 is a view, partly in section and partly in elevation, of a nuclear reactor thermoelectric power plant embodying principal features of the invention.

Referring to the drawings, and particularly to FIG. 1, the power plant shown therein comprises generally a nuclear reactor 10, a neutron shield tank 9, a thermoelectric generator 8 and a control rod drive mechanism 7. The reactor 10 is preferably of the pressurized water cooled type and includes a generally cylindrical vessel 11 having a hemispherical bottom 12 and a substantially flat head 13, a surge chamber 14, a generally cylindrical core barrel 15, a reactor core 16 supported by the barrel 15 and a plurality of control rods 17 which are actuated as one bank by the drive mechanism 7.

The reactor vessel 11 is attached to the top of the shield tank 9 which is generally spherical in shape with a flat top portion 18 having a centrally disposed opening 19 therein for receiving the reactor vessel 11. The top 13 of the vessel 11 has a horizontally extending flange 21 which is attached to the top 18 of the shield tank 9 by a plurality of bolts 22. The shield tank 9 is supported by a skirt or base 23, the upper end of which is secured to the tank 9 as by welding at 24. Vents 25 are provided in the skirt 23 to permit sea water to enter the inside of the skirt.

Figure 3:
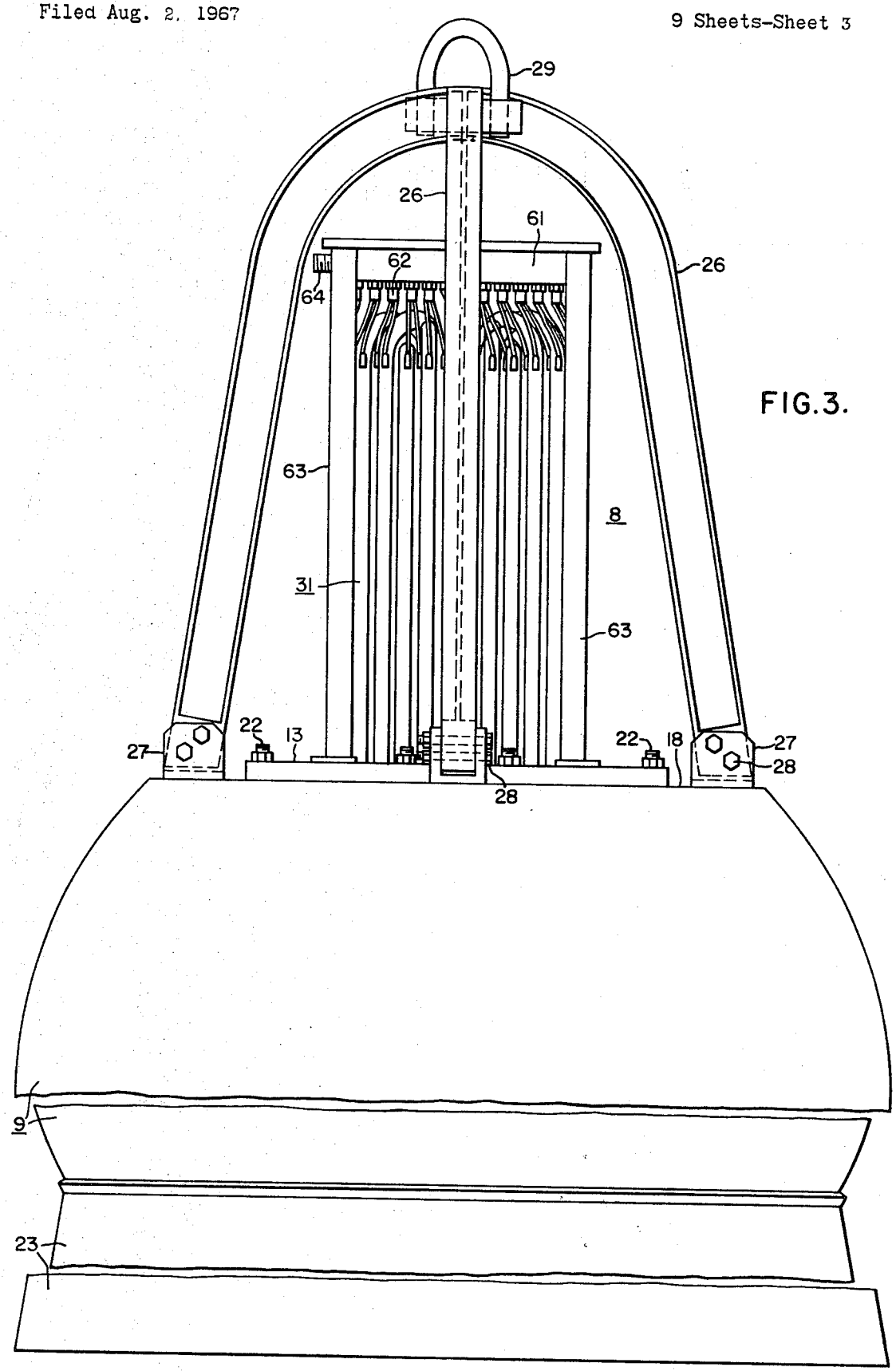
FIG. 3 is a view, in elevation, of a handling structure for the power plant.
Figure 4:
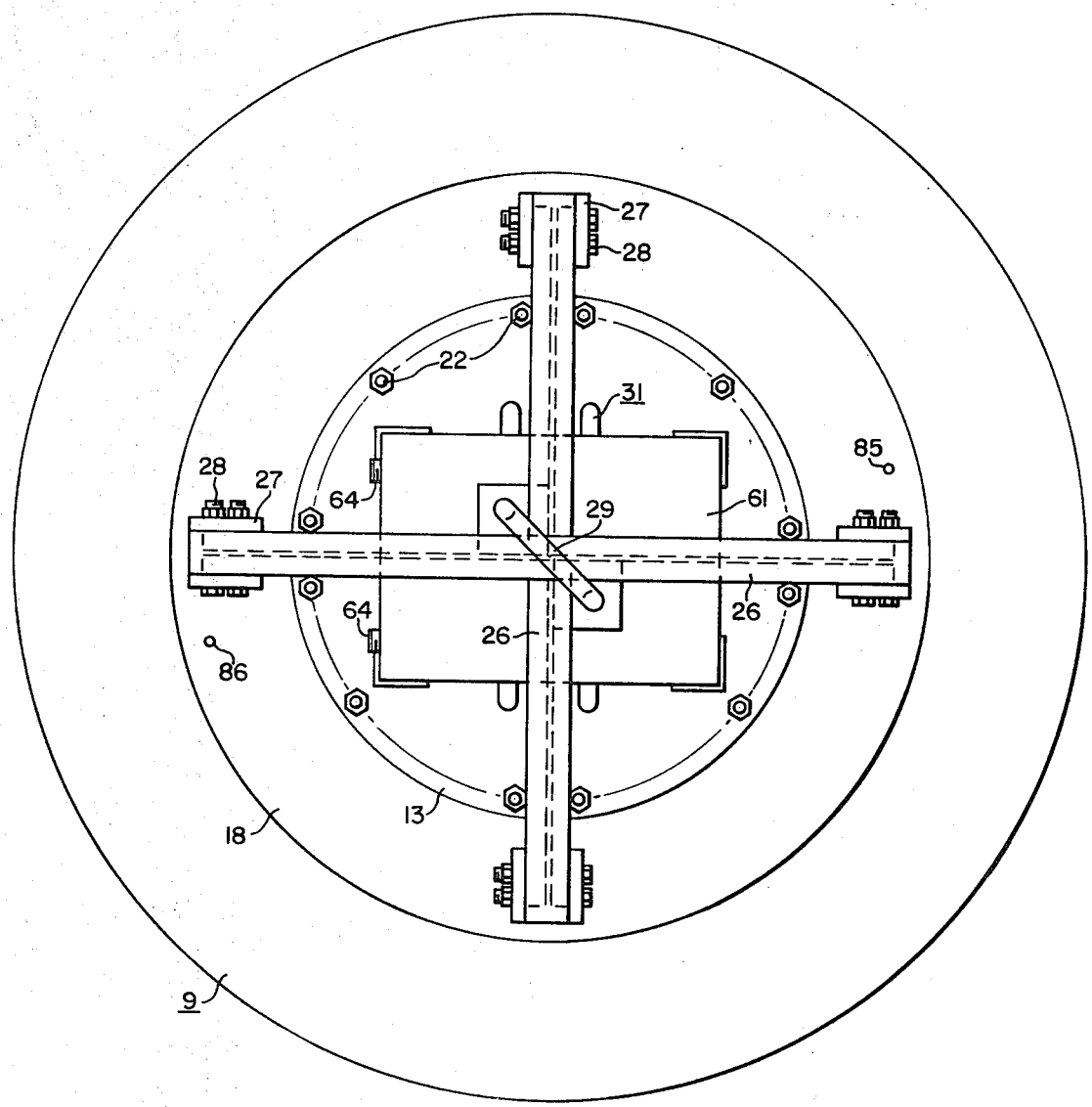
FIG. 4 is a view, in plan, of the structure shown in FIG. 3.

A structure for handling the assembled thermoelectric plant is shown in FIGS. 3 and 4. Two I-beams 26 form an arched structure which is attached to the reactor vessel support plate 18 by means of lugs 27 secured to the plate. The beams 26 are bolted to the lugs 27 by bolts 28. A shackle 29 is provided at the top of the handling structure for lifting the plant.

The reactor vessel 11 is constructed of a metal, such as Inconel, which possesses good strength at elevated temperatures and is resistant to stress corrosion in a sea water environment. Insulation against heat loss from the primary coolant which is in the reactor vessel is provided by the vessel itself and the walls of the surge chamber 14. The vessel head 13 is a relatively thick Inconel forging in order to provide a tube sheet for the ends of the legs of U-tubes 31 of the thermoelectric generator 8. The head 13 has a downwardly extending annular projection 32 which is welded to the vessel 11 by a full penetration weld 33. The bottom 12 of the vessel is hemispherical in shape to provide additional space to accommodate the thermal expansion of the liquid coolant. The thickness of the bottom 12 is made the same as that of the cylindrical section of the vessel so that it can also act as insulation for the primary coolant. The bottom 12 may be formed integrally with the cylindrical section or it may be formed separately and welded to the cylindrical section.

As shown in FIG. 5, the portion of each one of the tubes 31 which extends through the head 13 and through which the primary coolant flows to the thermal electric units is insulated with a cartridge of alumina 37. Each tube 31 is of a double wall construction having an outer wall 34 which forms the pressure boundary for the primary coolant and an inner wall 35 which extends below the bottom side of the head 13 for a purpose which will be explained hereinafter. The outer pipe 34 is welded to the underside of the vessel head 13 with a tube-to-tube sheet weld. The alumina insulation 37 is housed by canning which is attached to the inner pipe 35. This assembly slides into the outer pipe and the inner pipe is attached to the section above it with a flared fit as shown at 38.

The core 16 is supported by the core barrel 15 which is attached to an annular downwardly extending projection 41 on the vessel head 13. The projection 41 forms a dividing line between the inlet and outlet stubs 35 of the thermoelectric generator as shown in FIG. 1. The core barrel 15 also separates the hot and cold legs of the primary coolant. As shown by the arrows in FIG. 1, the coolant flows downwardly through a downcomer area 42 outside the barrel 15 and upwardly through a riser area 43 inside the barrel 15.

The annular surge chamber 14, fabricated of Inconel, provides the volume required to accommodate the thermal expansion of the primary coolant. The chamber 14 comprises an outer vessel wall 44 which fits closely inside the reactor vessel 11 and has a hemispherical bottom 45, and an inner vessel wall 46 spaced from the outer wall 44 and has a flat bottom 47. The outer and inner walls are closed at the top with a flat portion 48. The surge chamber acts as a pressurizer for the primary coolant. It is placed in operation as follows: the reactor plant is evacuated, and then filled with water. Some water is next drained off by pressurizing with hydrogen, or other suitable gas, until the water level in the surge chamber is approximately 10½ inches from the bottom. The upper portion of the chamber is then pressurized to approximately 400 p.s.i. with hydrogen gas.

The surge chamber is fitted with a standpipe 49 which connects the circulating portion of the coolant with the surge space. The extension of the standpipe into the hemispherical portion of the surge space minimizes the volume of water in the system. This also minimizes the volume in the surge chamber required to accommodate the thermal expansion of the coolant.

As shown in FIG. 1, the surge chamber 14 is held in position vertically by Belleville springs 51 between the horizontal portion 48 of the surge chamber and the underside of the reactor vessel head 13. The springs 51 also serve to restrict circulation of primary coolant into the space between the outer wall of the surge chamber and the reactor vessel 11. The chamber is supported laterally by the pressure vessel wall to reduce heat loss in the radial direction and below the vessel. The walls of the surge chamber are 1½ inches thick which is about half the thickness of the vessel wall. It will be understood that all dimensions given in this specification are merely representative for a particular size of power plant.

Figure 2:
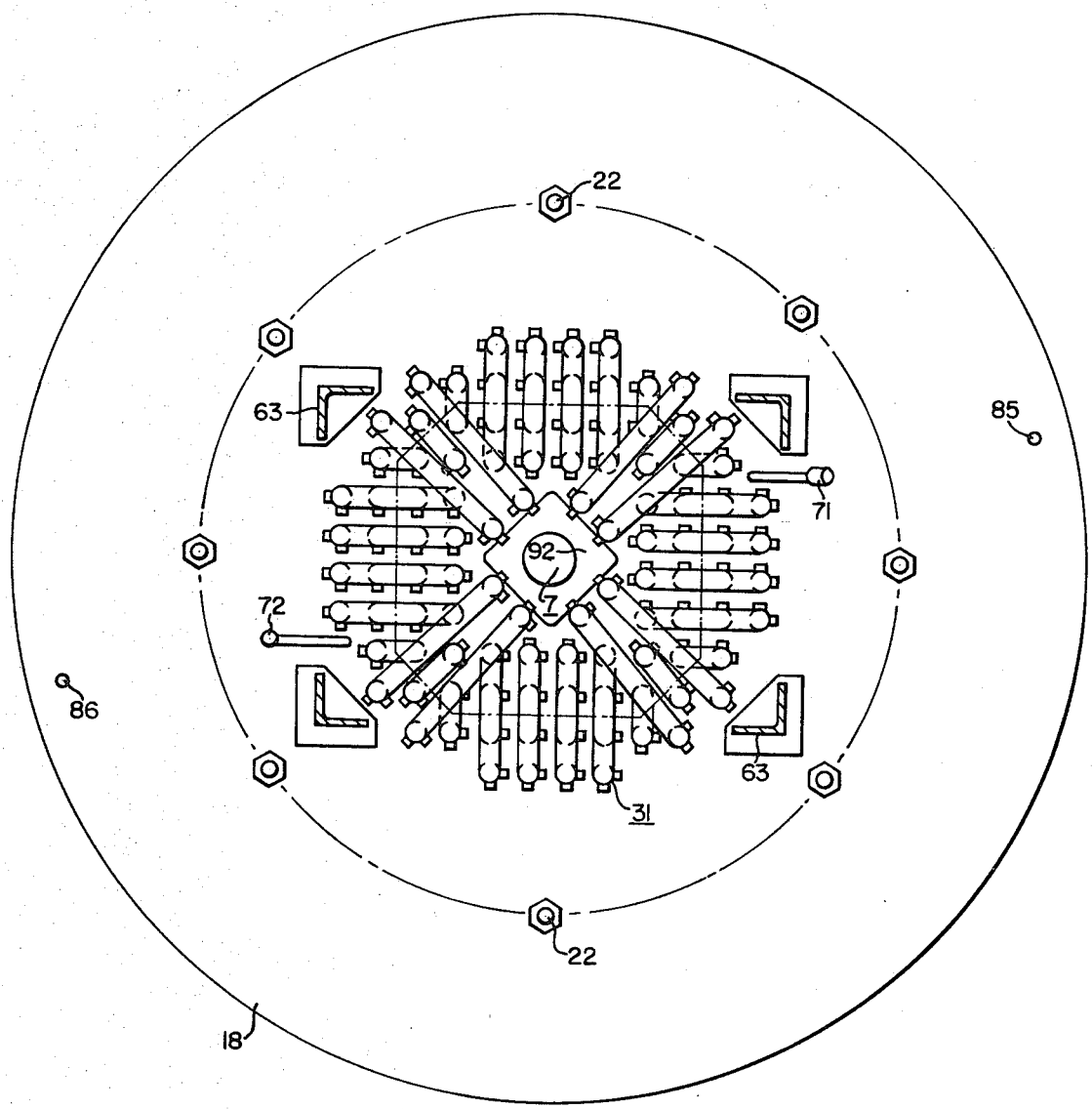
FIG. 2 is a view, in plan, of the power plant shown in FIG. 1.

The thermoelectric generator 8 shown in FIGS. 1 and 2 consists of 104 elements, including two spares. Two elements are paired to form an individual U-tube assembly which can be checked out as a unit prior to assembly into the vessel head. The U-tube assemblies are attached to the reactor vessel head 13 as shown in FIG. 5 and as previously described. The thermoelectric elements may be generally of the type described in Pat. 3,117,913 issued Jan. 14, 1964, to W. E. Shoupp and assigned to the Westinghouse Electric Corporation.

The U-tube thermoelectric assembly consists of four subassemblies which are shown in FIGS. 5 and 6. The four subassemblies are: a double-walled pipe section 31a which penetrates the reactor vessel head 13 in the manner previously described; an insulated transition section 31b, located just above the penetration section, which has the same diameter as the thermoelectric element but contains only installation; a thermoelectric section 31c, located above the transition section; and a U-bend 31d at the top of each pair of tubes. As previously described, the subassembly that penetrates the reactor vessel head serves to reduce heat loss from the coolant. The insulated transition section 31b occupies the space designated as the sea water inlet plenum section 50 of the thermoelectric generator. The plenum serves to permit circulation of the sea water over the surface of the thermoelectric elements, which are just above the plenum. Heat loss from this section is minimized by stainless steel wool insulation 52 disposed between the outer wall 34b and the inner wall 35b of the double-walled tube assembly.

The U-bend 31d above the thermoelectric elements, shown in FIG. 6, is connected to the top of the thermoelectric units. Like the penetration portion of the U-tube assembly, it is a double-walled pipe, the outer pipe 34d of which forms the pressure boundary. Stainless steel wool insulation 52 between the inner and outer pipes reduces heat loss and tends to restrict circulation of coolant which occupies the annular space. A spacer 53 between the outer and inner pipes centers the inner pipe and keeps it in place after the assembly. The inner pipe 35d fits tightly into the upper end of the inner pipe 35c of the thermoelectric section to form a seal which restricts coolant from circulating into the annular space. In order that both electrical leads may emerge at the same end of each one of the thermoelectric elements, each element is of a split stack configuration. In such a configuration the thermoelectric materials are semicylindrical wafers, insulated along the axis of the element by means not shown and so arranged that electricity flows from the top of one-half of the element, through a cross-over conductor at the bottom, and up the adjacent semicylindrical stack.

Electrical attachment to each of the thermoelectric elements is made through a cable connector 54 shown in FIGS. 6 and 7. The connector 54 is threaded into a receptacle at the top of the thermoelectric element 31c. A body portion 56 containing conductor pins 55 is welded to the outer tube sections 34c and 34d and also to the inner tube section 35c. Two conductors 57 are housed in each connector 54, as shown in FIG. 7, to make connections to the positive and negative terminals from each thermoelectric element. The conductors 57 are insulated by insulation 58 which is vulcanized at 59 to provide a seal at the connector receptacle junction.

The two electrical conductors 57 from each thermoelectric element enter a junction box 61 through a single connector 62. As shown in FIGS. 1 and 2, the junction box 61 is generally rectangular in shape and is mounted on the vessel head 13 by means of four angle shaped members 63, one member being provided at each corner of the junction box. The connectors 62 are of a watertight commercially available type suitable for sealing the openings in the box of 61 through which the conductors 57 enter. Two large openings 64 are provided at one side of the box 61 for the main power leads to the load distribution and control center. The junction box 61 is oil filled and is equalized with submergence pressure by a neoprene diaphragm acting between the sea and dielectric oil in the box.

The principal function of the shield tank 9 is to minimize neutron activation of the surrounding sea water. As previously explained, the tank is also used to support the reactor vessel thermoelectric generator assembly. The shield tank is spherical in shape to minimize weight and cost. It is preferably constructed of carbon steel.

The shield tank 9 is pressure compensated through a two-way relief arrangement including valves 65 and 66 which allow exchange of water between the shield tank and the sea. With the exception of the startup period, very little interchange of water takes place. A maximum differential pressure of approximately 25 p.s.i. can exist between the sea and the tank as a result of overlap of the relief valve settings.

As previously described, the flange 21 on the reactor vessel head 13 is bolted to the horizontal support plate 18 which is part of the shield tank 9. The plate 18 is constructed to support the reactor vessel and the load imposed by the maximum expected differential pressure between the sea and the shield tank. An O-ring seal 67 is provided between the flange 21 and the support plate 18.

The reactor core 16 is of the conventional pressurized water type using zircaloy clad uranium dioxide ($UO_2$) fuel rods. Core startup is controlled by the control rods 17 acting in one bank. The control rods are preferably Inconel clad, containing a silver-indium-cadmium alloy. The control rods acting in one bank are driven by one mechanism 7 which is preferably of a magnetic jack type, such as described in 3,158,766 issued Nov. 24, 1964, to E. Frisch, and assigned to the Westinghouse Electric Corporation. Since the structure and operation of the drive mechanism are fully described in the aforesaid patent, they will not be described in detail in this application.

A fuel enrichment of approximately 20% $U^{235}$ may be provided if required. Reactivity changes due to fuel burn up throughout the core life are small and are counter balanced by small changes in coolant temperature through the mechanism of a moderator density coefficient. After equilibrium has been initially achieved, the core will perform at nearly constant power level throughout life with no adjustment of the control rods required.

Before the assembled plant is set into the sea, the shield 9 is filled with pure water to minimize radioactive disposal problems upon retrieval of the plant. As noted earlier, earlier, some contamination of the shield water with sea water will take place as the pressure equalizes when the plant is lowered to the ocean floor. However, the activation problem for the exchange of small quantities of sea water is not significant. After startup no appreciable exchange between sea water and the shield tank water should take place. Further, any water that is discharged from the shield tank through the relief valve will be delayed from mixing with the sea by a holdup plenum. This plenum is the space between the shield tank 9 and the support skirt 23, where the relief valves are located.

The present power plant is constructed to operate unattended for extended periods of time. Therefore, emphasis has been placed on reliability and maintenance free operation. Natural circulation of the coolant contributes to achieving these objectives inasmuch as a pump is not required. The reactor core provides the thermal head which drives the coolant to the thermoelectric units. The sea acts as the heat sink.

Plant pressure is maintained by a combination of hydrogen over-pressure and water vapor pressure in the surge chamber 14. The standpipe 49 at the bottom of the surge chamber connects the chamber with the circulating portion of the primary coolant. A pressure release valve attached to the upper head 13 protects the plant from primary coolant pressure in excess of 2500 p.s.i.g. The valve, not shown in the drawings, is of a balanced bellows, self actuated type. A rupture disc in the valve line provides the hermetic leak tightness required of the system during normal operation.

To provide an understanding of the function of the pressurizing system, the steps followed in an initial pressurization are outlined below. Just prior to the time when the thermoelectric plant is to be placed in use, the system is evacuated and reactor grade water of appropriate pH is added to the reactor vessel. Evacuation of the primary containment is accomplished through a vent line 71 which runs from the reactor vessel head to the top of the surge chamber. The vacuum pump is placed at an elevation above the top of the thermoelectric generator to aid in complete evacuation. Reactor grade water is added through a fill line 72 in the head of the reactor vessel.

After the system is completely filled, a measured quantity of primary water is drained from the vessel at the fill line by applying hydrogen pressure at the vent line. The quantity of water drained should be such that the water level in the surge chamber is 10½ inches above the bottom of the standpipe. This level will permit up to a 60° tilt of the plant during handling without permitting hydrogen to escape from the surge chamber.

The fill line is then secured, and the hydrogen pressure increased to 430 p.s.i.a. The gas volume, with the plant cold, is approximately 10 cubic feet. The vent line is then secured, and both the vent and the fill lines are sealed by welding.

Upon heat-up of the plant, thermal expansion of the water compresses the hydrogen in the surge chamber 14 to a pressure of 1850 p.s.i.a., assuming that no hydrogen is dissolved in the water. (A calculation of the diffusion of hydrogen in the water indicates that several months are required for equilibrium concentration to be reached in the water. Thus, very little hydrogen is expected to go into solution during the initial fill and start up period.) The partial pressure of the water vapor in the surge chamber is 250 p.s.i., with an average water temperature of 400° F. The total system pressure initially is thus 2100 p.s.i.a. If a different water temperature is obtained, some adjustment of the initial pressure of hydrogen can be made to yield the desired operating pressure.

As the plant operates, some of the hydrogen in the surge chamber will dissolve in the coolant until an equilibrium concentration is reached. The concentration of dissolved hydrogen is dictated by its solubility in the water at the temperature of the gas-water interface in the surge chamber. As the hydrogen dissolves and a uniform concentration is reached throughout the coolant, the system pressure drops to 1800 p.s.i.a.

Some hydrogen, however, may be released from the primary coolant which may boil in the hot channel. Accordingly, a gas accumulation space 73 at the underside of the reactor vessel head 13, and also at the top of the U-bend of the U-tubes is provided to prevent blanketing and flow stoppage in the tubes if some hydrogen were to be released. The gas accumulation space 73 in the reactor vessel is provided between the stub ends 35 of the thermoelectric element and the underside of the vessel head 13. Any gas collected in the space will tend to be redissolved in the coolant, further minimizing the effects of gas blanketing. In the U-tubes, a vent 74, FIG. 6, in the top of the inner pipe 35d allows any gas in the tube to accumulate in the annular space between the inner and outer pipes. Liquid can flow into and out of the annular space in the U-bend depending on the gas evolution/dissolution rate. The segment of space between the vent hole 74 and the outer tube 34d is that space which is referred to as providing for gas accumulation.

In the event the plant is shutdown, restart is possible without gas blanketing interfering with flow circulation in the thermoelectric tubes. Any gas which is released during shutdown will be accumulated in the space 73 and at the tops of the U-tubes in roughly the proportion of their areas which face the flow of coolant. Ample space is provided at the top of each U-tube for the accumulation of any gas released in the tube. Thus, normal restart of the reactor plant is possible without gas blanketing affecting coolant circulation.

A cross section of one of the thermoelectric elements utilized in this application is shown in FIG. 8, and an enlarged detail view is shown in FIG. 9. Heat is transferred from the reactor primary coolant, which flows in a central channel of circular cross section, through the inner cladding 35c, an inner boron nitride insulation sleeve 75, and a hot junction iron conductor 76 into lead telluride thermoelectric material 77. Heat flow out of the thermoelectric material is through a cold junction iron conductor 78, an outer boron nitride insulation sleeve 79 and the outer cladding 34c, to the sea which acts as a heat sink. The inner and outer metal cladding 35c and 34c, respectively, is preferably composed of Inconel. As explained in the aforementioned Pat. 3,117,913, other suitable thermal electric material, such as ferric sulphide ($Fe_2S_3$) and ferrous sulphide (FeS), may be utilized. Mica insulation 81 is provided to insulate adjoining discs of the thermoelectric material. The construction and operation of a thermoelectric generator, such as the present type, is fully described in the aforesaid Pat. 3,117,913 and will not be described in detail in this specification.

The electrical path through the elements is shown by the dotted line in FIG. 9. The current path is from the conductor pin 55 through an iron end conductor 82, p-type lead telluride, the hot junction ring 76, n-type lead telluride, and the cold junction ring 78, to the p-type material of the next thermocouple pair. A large number of these thermocouple pairs comprise the complete element.

The voltage produced by one thermoelectric element is proportional to the number of thermocouple pairs which the element contains. The output of one element is generally at a voltage level too low to permit direct connection to the load. A number of thermoelectric elements must be connected in series to supply voltage at the proper level.

A series-parallel electrical arrangement of thermoelectric elements 31c is shown in FIG. 10. A connection of three parallel rows each having 34 series connected thermoelectric elements of the type utilized in the present structure produces approximately 118–136 volts, when loaded with a 15–20 kw. load. There are two spare thermoelectric elements available in the generator assembly. One or both of these can be used in the circuit in the event any of the other elements fail or are damaged after the assembly of the reactor vessel is completed.

The number of thermoelectric elements in parallel is such that the failure of one element in the open mode will result in a 50% increase in the current flowing through the two elements in parallel with the failed element. The calculated increase in thermoelectric material temperature, due to this current increase, is about 30°. Since the elements are operating at a low temperature level, they are capable of accommodating this increase without damage. Thus, failure of one element in the open mode will not result in a "cascade" of failures in other elements. Failure of a single element in the open mode reduces the output of this system by less than 200 watts. Main power connections are shown at 83 and 84. As previously explained, the series parallel connections are made in the junction box 61 at the top of the thermoelectric generator 8.

The reactor control system for the thermoelectric power plant is constructed to perform the following functions:

(1) Startup by an operator from a remote location with the plant in place on the ocean bottom.

(2) Shutdown by an operator from a remote location.

(3) Shutdown automatically in the event the integrity of the primary coolant system is bleeched.

Reactivity changes resulting from load power changes, sea water temperature changes, fouling of the heat transfer surfaces of the thermoelectric elements, and fuel burn-up will be compensated by changes in coolant temperature and reactor power, through the mechanism of the coolant density and fuel Doppler coefficient of reactivity.

The reactor controls and instrumentation are shown in block diagram form in FIG. 11. These controls function only during startup on the unit. One startup procedure is to have the completed plant evacuated, filled, and pressurized with gas at dockside in the manner hereinbefore described. It is then transported to location and, after filling the shield tank with pure water by means of a shield tank fill line 85 and a vent line 86 for permitting air to escape from the tank while being filled, it is lowered to its site on the ocean bottom. The site for the unit is prepared as necessary prior to landing. A cable connects the control rod drive and the instrumentation transmitters to the power supplies and readouts, which are located remotely from the reactor. The remote location may be a barge or surface ship. All power to the transmitters is supplied from power supplies located at the remote location.

Startup of the reactor is accomplished from the remote location. The control rod drive mechanism is unlatched by energizing a scram magnet to disengage a scram latch shown in FIGS. 12 and 13. Vertical movement of the control rods 17 is obtained by operation of the magnetic jack mechanism 7 which is above the scram latch 91. The magnetic jack mechanism is actuated by energizing solenoid coils 92, 93 and 94 in a predetermined sequence as described in the aforesaid Frisch Pat. 3,158,766. The power supply for the magnetic jack and a rotary switch assembly for its control are at the remote location. Neutron detectors located in the shield tank provide power level and rate information throughout the startup. After criticality has been achieved, reactor power is increased until the desired plant heat-up rate is reached. During the heat-up, plant pressure and temperature are monitored with the instrumentation shown in FIG. 11. As operating temperature is approached, the output voltage of the thermoelectric generator increases to its normal value.

The system is monitored for the first twelve to fifteen hours of power operation to ensure that it is functioning properly and to allow fission product poison (Xenon) to approach equilibrium. During this period, rod position is controlled to maintain the desired power level and operating temperature. After equilibrium conditions are achieved, the control rod mechanism is latched in position by deenergizing the scram magnet 95 and thus engaging the scram latch 91. The instrumentation and control cable can now be disconnected at the remote location.

Figure 12:
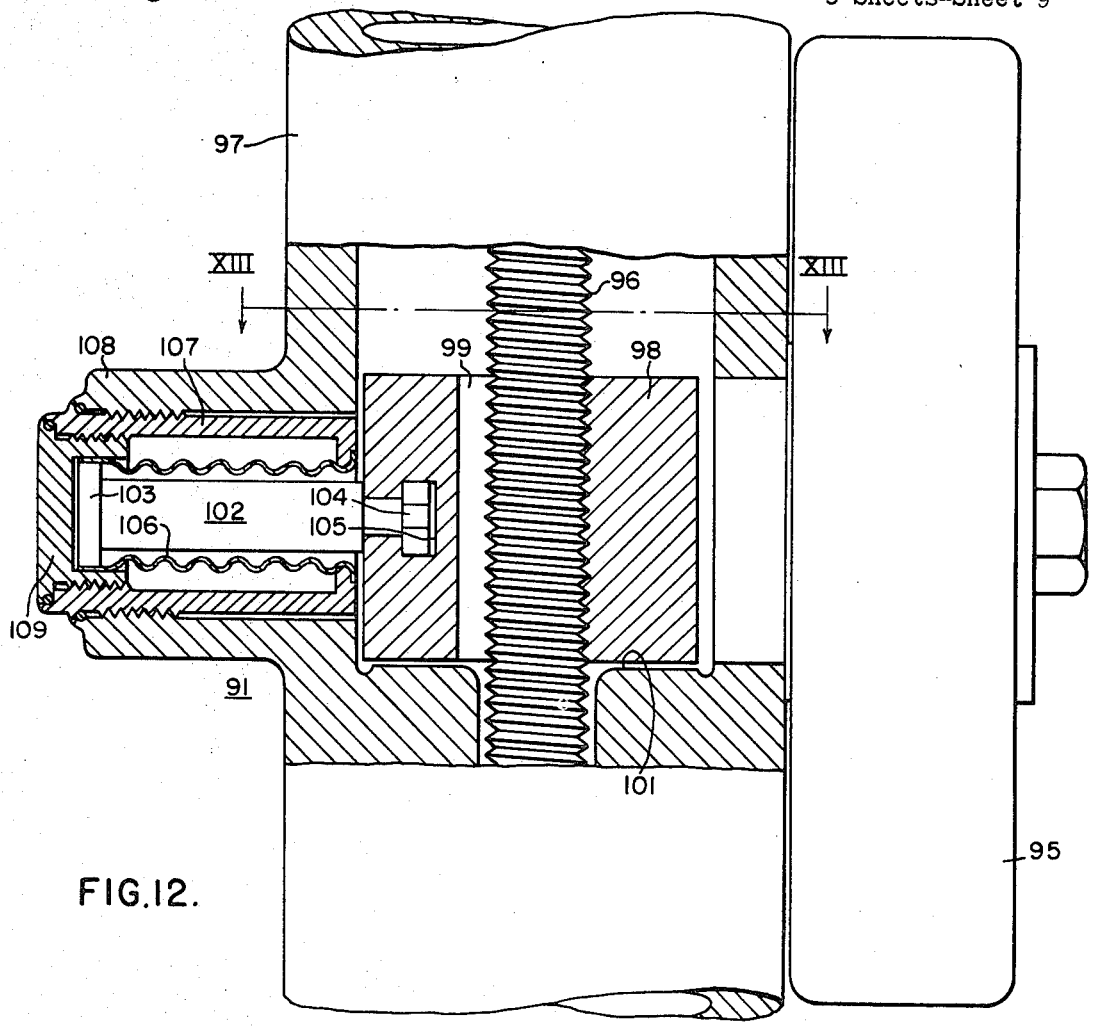
FIG. 12 is a view, partly in section and partly in elevation, of a scram latch for the control rod drive mechanism of the reactor.
Figure 13:
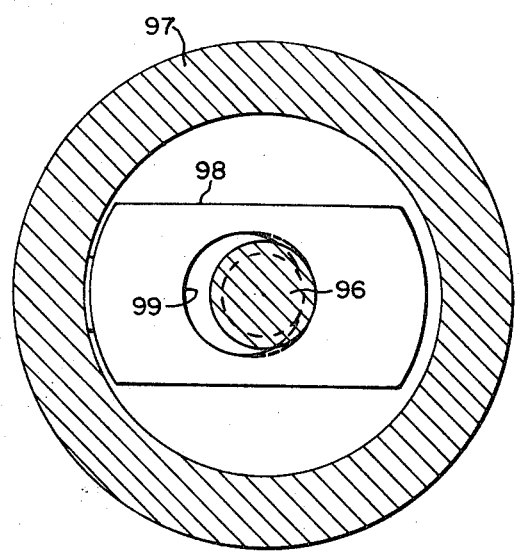
FIG. 13 is a sectional view, taken along the line XIII—XIII in FIG. 12.

Details of the scram latch 91 are shown in FIGS. 12 and 13. A lead screw 96 of the magnetic jack type is disposed inside a sealed tubular housing 97 which extends through the reactor vessel head 13 and is, therefore, pressurized by the internal pressure of the reactor. A latch ring or block 98, having threads on one side of an opening 99 through the block for engaging the threads on the lead screw 96, is movably disposed inside the tube 97 to rest on a shoulder 101 in the tube. The opening 99 is of sufficient size to permit the block 98 to be moved horizontally to disengage the threads in the block from threads on the lead screw 96. A piston 102, having an enlarged head 103, is attached to the ring or block 98 by means of a member 104 disposed in a slot 105 in the wall of the block 98. One end of a bellows 106 is secured to the inner end of a housing 107 threaded into a projection 108 on the wall of the tube 97. The other end of the bellows 106 is secured to the piston head 103 slidably disposed inside a cap 109 threaded into the outer end of the housing 107. Thus, the coolant system pressure normally keeps the threads on the latch ring or block 98 engaged with the threads on the lead screw 96 since the system pressure is applied to the piston head 103 inside the bellows 106 the inner end of which communicates with the interior of the tubular housing 97. When the system pressure falls below a predetermined amount, the bellows 106 functions as a tension spring to release the latch ring or block 98 from the lead screw 96. The latch ring or block 98 can also be released by energizing the magnet coil 95 to attract the block 98 which is composed of magnetic material and functions as an armature for the core of the magnet coil 95.

In order to manually shutdown the power plant for removal and/or transport to another location, the scram magnet 95 is energized, releasing the scram latch and dropping the control rods. The electrical leads from the scram magnet may be brought out to a location adjacent to the load for the power plant. Connecting a low voltage DC source to the magnet leads energizes the scram magnet to drop the control rods. Restart is accomplished by reconnecting the remote instrumentation and control cable at the load junction box.

Four factors contribute to the inherent safety of the thermoelectric power plant:

(1) The control rod drive mechanism is normally deenergized. As a result, reactivity insertion accidents are improbable.

(2) The high coolant density coefficient of reactivity and the high fuel Doppler coefficient of reactivity result in a reactor which is inherently self-protecting in the unlikely event that a reactivity insertion accident should occur.

(3) The likelihood of burnout from any cause is very small because of the very low reactor heat flux.

(4) The normal operation of the plant, without forced convection, eliminates consideration of the loss of coolant pumping power as a possible cause of fission product release to the reactor coolant.

A release of fission product to the sea can occur only if the integrity of the primary coolant system is breeched. A large release is prevented by the self-actuated scram latch, built into the control rod drive mechanism. As previously described, the bellows connected to the latch proper senses system pressure. When the system pressure drops below a preset value, the latch is released and the control rod, assisted by a scram spring 111, shown in FIG. 1, are driven to the bottom of their travel, shutting down the reactor.

From the foregoing description it is apparent that the invention provides a means for supplying electrical power from an unattended, compact nuclear reactor coupled with a thermoelectric generator. The power plant described herein is intended for underwater application, although it could be used in any location in which a heat sink is available for cooling. The nuclear reactor thermoelectric generator described herein utilizes a pressurized water reactor as a source of heat, and tubular thermoelectric elements for the generation of electricity. However, other reactor coolants and thermoelectric geometry can be adapted in the present concept.

Since numerous changes may be made in the above-described construction and differed embodiments of the invention may be made without departing from the spirit and scope thereof, it is intended that all subject matter contained in the foregoing description or shown in the accompanying drawings shall be interpreted as illustrative and not in a limiting sense.

We claim as our invention:

1. A nuclear reactor thermoelectric power plant for underwater operation comprising a generally cylindrical reactor vessel having a hemispherical bottom and a substantially flat head, a plurality of inverted U-tubes having portions of their legs extending through the head, thermoelectric elements encircling the legs of the tubes above the head, a core barrel suspended from the head with one end of each U-tube being disposed inside the barrel and the other end being disposed outside the barrel, a reactor core mounted inside the barrel, and a liquid coolant in the reactor vessel flowing by natural circulation upwardly through the core and the portions of the U-tubes having ends inside the barrel and downwardly through the portions having ends outside the barrel to transfer heat from the core to the interior of the thermoelectric elements by convection.

2. The power plant defined in claim 1 wherein the portions of the U-tubes extending above the head are exposed to the water in which the power plant is submerged.

3. The power plant defined in claim 1 including a surge chamber within the reactor vessel partly filled with a pressurizing gas and interconnected to the reactor cooling system to maintain the liquid coolant under pressure in the vessel.

4. The power plant defined in claim 3 wherein the surge chamber includes an outer vessel wall fitting inside the reactor vessel and an inner vessel wall spaced from the outer vessel wall with the top of the inner vessel wall joined to the top of the outer vessel wall.

5. The power plant defined in claim 4 wherein the core barrel is disposed inside of and spaced from the inner vessel wall of the surge chamber, and including a standpipe extending from inside the inner vessel wall substantially to the bottom of the outer vessel wall of the surge chamber.

6. The power plant defined in claim 1 wherein the U-tubes are of a double wall construction with insulation between the walls in the portions of their legs extending through the head and in the U-bends, and thermoelectric material between the walls of other portions of the legs of the tubes.

7. The power plant defined in claim 6 wherein the inner walls of the U-bends have vents therein to permit gas released from the liquid coolant to accumulate between the walls of the U-bends.

8. The power plant defined in claim 1 wherein the lower ends of the legs of the U-tubes extend below the reactor vessel head to provide space between the head and the liquid coolant for the accumulation of gas which may be released from the coolant under abnormal conditions.

9. The power plant defined in claim 1 including a generally spherical shield tank attached to the head to enclose the reactor vessel, and a skirt attached to the shielded tank to support the tank and the reactor vessel.

10. The power plant defined in claim 9 wherein the shield tank is filled with water and is pressure compensated with submergence pressure through a two-way relief valve arrangement.

References Cited

UNITED STATES PATENTS

| | | | |
|---|---|---|---|
| 3,118,818 | 1/1964 | Bray | 176—65 X |
| 3,213,833 | 10/1965 | Cunningham et al. | 176—65 X |
| 3,262,820 | 7/1966 | Whitelaw | 176—39 X |
| 3,276,914 | 10/1966 | Shoupp | 176—39 |
| 3,325,374 | 6/1967 | Margen | 176—61 |

REUBEN EPSTEIN, Primary Examiner

U.S. Cl. X.R.

176—39, 50, 36, 20